US007798052B2

(12) United States Patent
Ikari

(10) Patent No.: US 7,798,052 B2
(45) Date of Patent: Sep. 21, 2010

(54) FLUID PRESSURE CYLINDER

(75) Inventor: Tetsuya Ikari, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 396 days.

(21) Appl. No.: 11/932,332

(22) Filed: Oct. 31, 2007

(65) Prior Publication Data

US 2008/0173169 A1 Jul. 24, 2008

(30) Foreign Application Priority Data

Nov. 29, 2006 (JP) ............................ 2006-321519

(51) Int. Cl.
*F16H 43/00* (2006.01)
*F15B 15/22* (2006.01)

(52) U.S. Cl. .......................................... 91/394; 91/409

(58) Field of Classification Search .................. 91/394, 91/404, 405, 409
See application file for complete search history.

(56) References Cited

U.S. PATENT DOCUMENTS

| | | | | |
|---|---|---|---|---|
| 3,296,942 | A | 1/1967 | Nelson | |
| 3,440,930 | A * | 4/1969 | Olson | 91/396 |
| 3,677,141 | A | 7/1972 | Lagerqvist et al. | |
| 4,088,061 | A * | 5/1978 | Stoll et al. | 91/408 |
| 6,553,889 | B2 * | 4/2003 | Migliori | 91/394 |
| 7,581,485 | B2 * | 9/2009 | Riedel | 91/395 |

FOREIGN PATENT DOCUMENTS

| | | |
|---|---|---|
| DE | 1 601 749 | 5/1970 |
| EP | 1 199 480 | 4/2002 |
| JP | 48-013916 | 5/1973 |
| JP | 53-071198 | 6/1978 |
| JP | 54-051288 | 4/1979 |
| JP | 58-089603 | 6/1983 |
| JP | 60-030529 | 2/1985 |
| JP | 60-73107 | 4/1985 |
| JP | 61-124706 | 6/1986 |
| JP | 63-166705 | 10/1988 |
| JP | 03-080107 | 8/1991 |
| JP | 05-296212 | 11/1993 |
| JP | 07-100550 | 4/1995 |
| JP | 7-34239 | 6/1995 |
| JP | 09-295071 | 11/1997 |
| JP | 10-299718 | 11/1998 |
| JP | 2000-337314 | 12/2000 |
| JP | 2002-263743 | 9/2002 |

* cited by examiner

*Primary Examiner*—Thomas E Lazo
(74) *Attorney, Agent, or Firm*—Paul A. Guss

(57) ABSTRACT

First and second cushion rings are arranged respectively on both end surfaces of a piston constituting part of a fluid pressure cylinder, through fitting grooves. The first and second cushion rings are formed with substantially hollow cylindrical shapes by press working a metal material, wherein the cushion rings effectuate a cushioning action, which decelerates the displacement speed of the piston, as a result of being displaced in the axial direction together with the piston and being received and accommodated within a recess of the head cover and a rod hole of the rod cover.

7 Claims, 6 Drawing Sheets

FLUID PRESSURE CYLINDER

BACKGROUND OF THE INVENTION

1. Field of the Invention

The present invention relates to a fluid pressure cylinder in which a piston is displaced along an axial direction under the supply of a pressure fluid, and more specifically, to a fluid pressure cylinder having a cushioning mechanism capable of buffering and absorbing shocks occurring at displacement terminal end positions of the piston.

2. Description of the Related Art

Heretofore, a fluid pressure cylinder, having a piston therein displaced under the supply of a pressure fluid, has been used, for example, as a transport device for transporting various workpieces and the like. In such a fluid pressure cylinder, it is known to provide a cushioning mechanism for buffering and absorbing shocks occurring at the displacement terminal end positions of the piston.

A fluid pressure cylinder having such a cushioning mechanism, for example as disclosed in Japanese Laid-Open Patent Publication No. 61-124,706, comprises a displaceable piston disposed inside a cylinder chamber, wherein an end of the cylinder chamber is closed by a head cover. Small pistons, which extend in the axial direction, are formed respectively on both end surfaces of the piston, wherein the small piston is inserted into a small cylinder of the head cover under a displacement action of the piston. Accordingly, air is enclosed within the small cylinder, which becomes compressed, thereby producing a cushioning effect.

However, in the conventional technique according to Japanese Laid-Open Patent Publication No. 61-124,706, because the small piston that makes up the cushioning mechanism is formed in the shape of a solid non-hollow shaft, which is connected integrally with respect to an end surface of the piston, compared to a fluid pressure cylinder that is not provided with such a cushioning mechanism, the weight thereof increases, and there are concerns about manufacturing costs being raised due to the presence of the small pistons.

SUMMARY OF THE INVENTION

A general object of the present invention is to provide a fluid pressure cylinder, which enables production costs to be reduced, along with making the fluid pressure cylinder lighter in weight.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
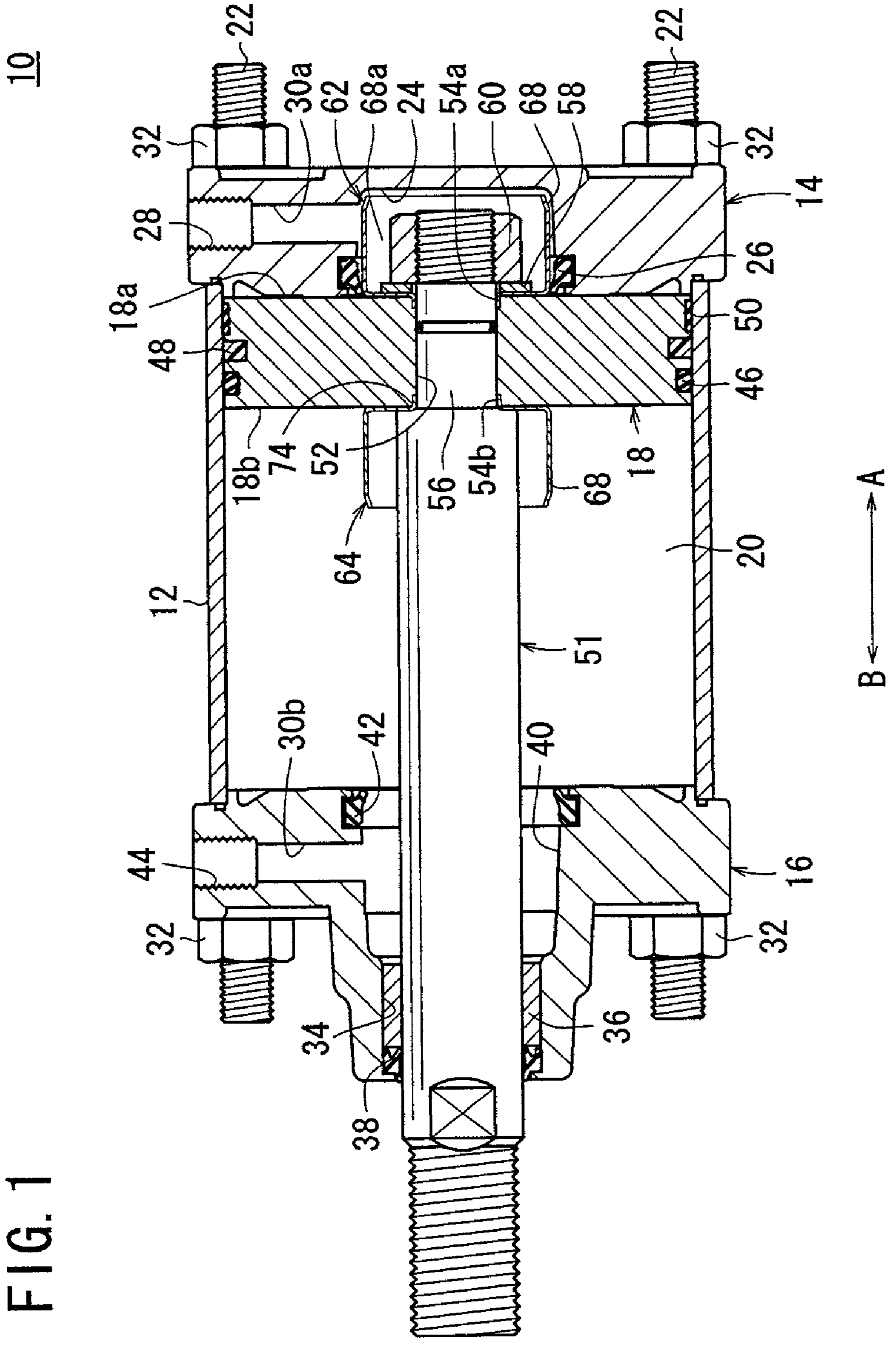
FIG. 1 is an overall vertical cross sectional view of a fluid pressure cylinder according to an embodiment of the present invention.

In FIG. 1, reference numeral 10 indicates a fluid pressure cylinder according to an embodiment of the present invention.

Figure 2:
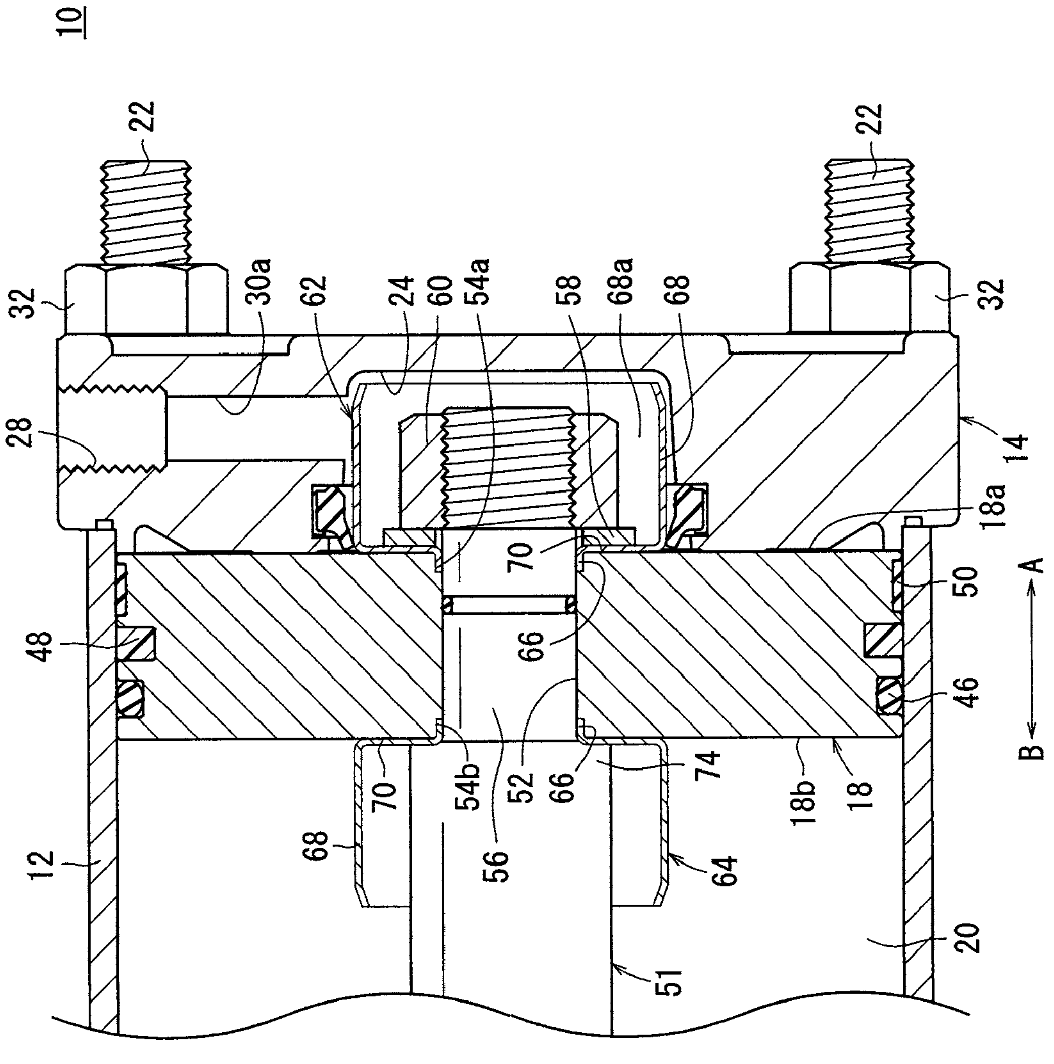
FIG. 2 is an enlarged cross sectional view in the vicinity of a head cover of the fluid pressure cylinder of FIG. 1.
Figure 3:
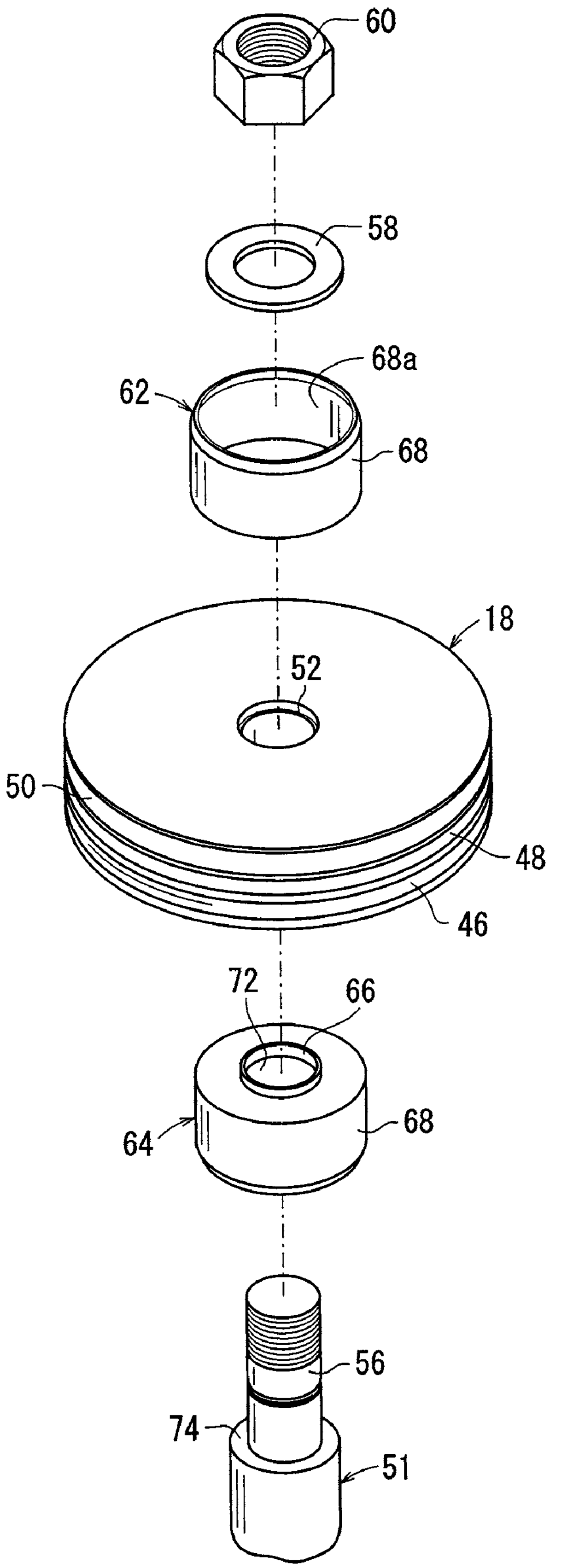
FIG. 3 is a partial exploded perspective view showing a state in which a piston, first and second cushion rings, a washer, and a nut are separated from a piston rod, in the fluid pressure cylinder of FIG. 1.
Figure 4:
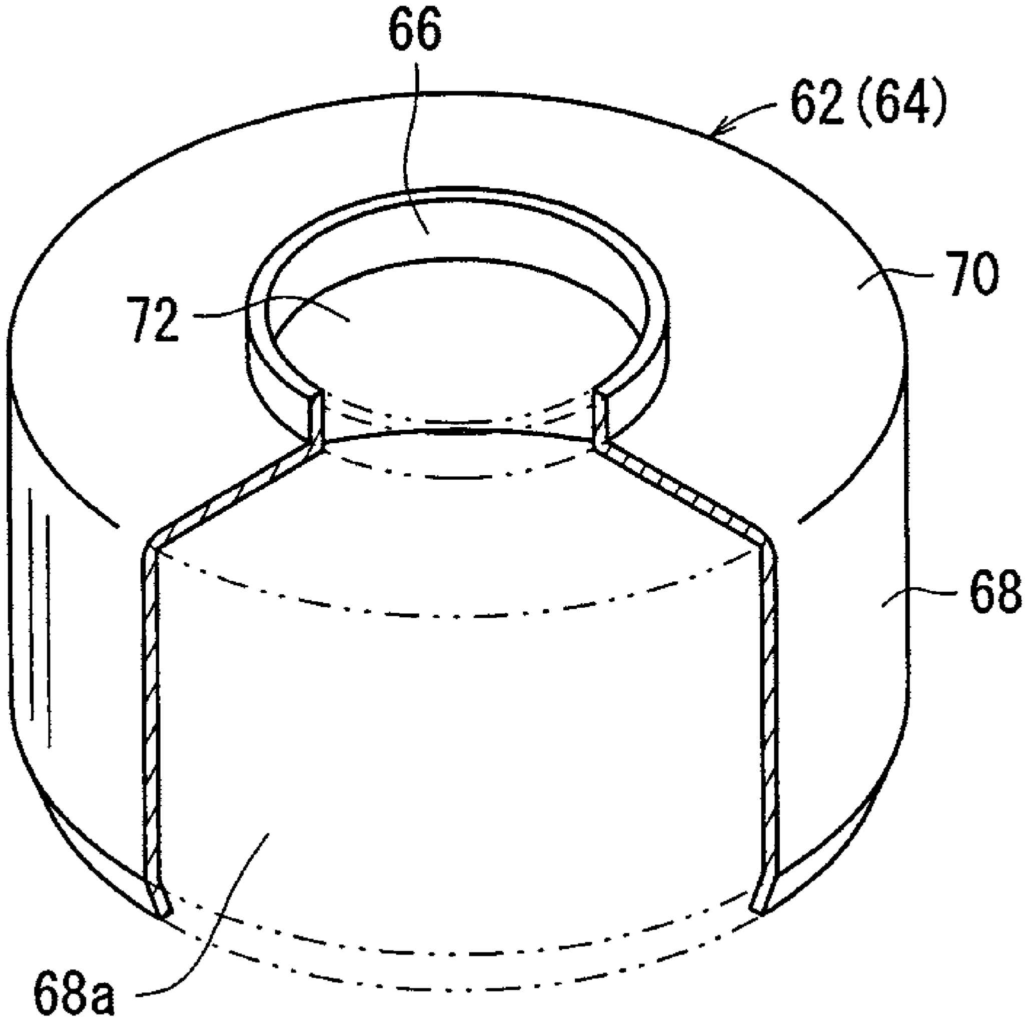
FIG. 4 is a partially cutaway perspective view of the first and second cushion rings.
Figure 5:
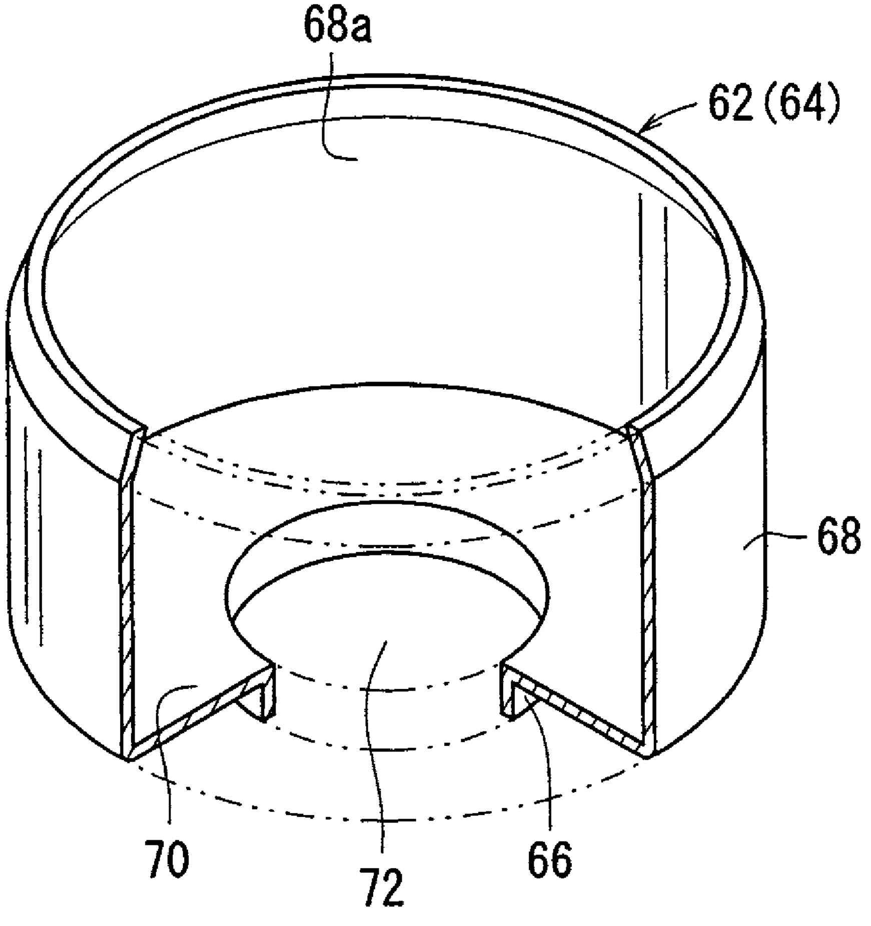
FIG. 5 is a partially cutaway perspective view, showing the content of FIG. 4 as viewed from a different direction.

The fluid pressure cylinder 10, as shown in FIGS. 1 to 3, includes a cylindrically shaped cylinder tube (cylinder body) 12, a head cover (cover member) 14 installed on one end of the cylinder tube 12, a rod cover (cover member) 16 installed on the other end of the cylinder tube 12, and a piston 18, which is disposed displaceably inside the cylinder tube 12.

The cylinder tube 12 is formed from a cylindrical body having a substantially constant diameter, with a cylinder chamber 20 formed therein, inside of which the piston 18 is accommodated.

The head cover 14 is formed, for example, from a metal material such as an aluminum alloy or the like having a substantially rectangular shape in cross section, with a plurality of through holes (not shown), which penetrate in the axial direction through the head cover 14 at the four corners thereof, and through which connecting rods 22 are inserted.

Further, a recess (accommodating hole) 24 is formed at a predetermined depth in the center of the head cover 14 facing toward the side of the cylinder tube 12. A first sealing ring 26 is installed in an annular groove formed along the inner circumferential surface of the recess 24. The recess 24 is formed with a substantially constant diameter circular shape in cross section, and communicates with the cylinder chamber 20 when the head cover 14 is installed onto one end of the cylinder tube 12.

Furthermore, a first fluid port 28 through which the pressure fluid is supplied and discharged is disposed on a side surface of the head cover 14, wherein the first fluid port 28 communicates with the recess 24 through a communication passage 30*a*. Specifically, pressure fluid supplied from the first fluid port 28 is introduced into the recess 24 through the communication passage 30*a*.

The rod cover 16 is formed, for example, from a metal material such as an aluminum alloy or the like having a substantially rectangular shape in cross section, with a plurality of through holes (not shown), which penetrate in the axial direction through the head cover 14 at the four corners thereof, and through which the connecting rods 22 are inserted. When the head cover 14 and the rod cover 16 are installed onto both end portions of the cylinder tube 12, the through holes are arranged co-linearly along the same lines respectively, and nuts 32 are threaded onto and engage with both ends of the connecting rods 22, which are inserted respectively through mutually facing through holes. Owing thereto, the head cover 14 and the rod cover 16 are connected to the cylinder tube 12. Stated otherwise, because the head cover 14 and the rod cover 16 are placed under tension in directions so as to mutually approach one another, the cylinder tube 12 is gripped and held between the head cover 14 and the rod cover 16.

Further, a central portion of the rod cover 16 bulges and projects in a direction away from the cylinder tube 12, wherein a rod hole 34 is formed therein, which penetrates through the central portion in the axial direction. A bush 36 and a rod packing 38 are installed along an inner circumferential surface of the rod hole 34. The rod hole 34 includes an expanded diameter portion (accommodating hole) 40, which gradually expands in diameter toward the side of the cylinder tube 12 (in the direction of the arrow A), wherein a second sealing ring 42 is installed on an inner circumferential surface of the expanded diameter portion 40 through an annular groove. The inner diameter of the expanded diameter portion 40 is roughly equal to the inner diameter of the recess 24. The rod hole 34 communicates with the cylinder chamber 20, when the rod cover 16 is installed onto the other end of the cylinder tube 12.

Furthermore, a second fluid port 44 through which a pressure fluid is supplied and discharged is disposed on a side surface of the rod cover 16, wherein the second fluid port 44 communicates with the rod hole 34 through a communication passage 30*b*. Specifically, pressure fluid supplied from the second fluid port 44 is introduced into the rod hole 34 and cylinder chamber 20 through the communication passage 30*b*.

The piston 18 is formed with a substantially circular cross sectional shape corresponding to the cross sectional shape of the cylinder tube 12. A piston packing 46, a magnet 48, and a wear ring 50 are installed on the outer circumferential surface of the piston 18 through a plurality of annular grooves.

Further, a piston hole 52 that penetrates in the axial direction (the direction of arrows A and B) is formed in the center of the piston 18, wherein one end of a piston rod 51 is inserted through the piston hole 52. The piston hole 52 includes fitting grooves 54*a*, 54*b* therein respectively on both end surface sides of the piston 18. The fitting grooves 54*a*, 54*b* are expanded in diameter just slightly with respect to the piston hole 52, and are formed so as to face toward the cylinder chamber 20.

The piston rod 51 includes a connecting section 56, which is reduced in diameter on one end thereof and connected to the piston 18, wherein the piston 18 is inserted onto the connecting section 56 through the piston hole 52. Further, the other end of the piston rod 51 is inserted through the rod hole 34 and supported displaceably by the bush 36. Threads are engraved along an outer circumferential surface on the connecting section 56, such that after the connecting section 56 is inserted through the piston hole 52, a washer 58 is inserted thereover and a connecting nut 60 is screw-engaged with the connecting section 56. As a result, the piston 18 is connected to the one end of the piston rod 51.

Further, first and second cushion rings (ring bodies) 62, 64 are installed respectively onto both end surfaces of the piston 18 through the fitting grooves 54*a*, 54*b*. The first and second cushion rings 62, 64 have substantially the same shape, wherein the first cushion ring 62 is disposed on one end surface 18*a* of the piston 18 on the side of the head cover 14 (in the direction of the arrow A), whereas the second cushion ring 64 is disposed on the other end surface 18*b* of the piston 18 on the side of the rod cover 16 (in the direction of the arrow B).

As shown in FIGS. 1 to 3, the first and second cushion rings 62, 64 are formed, for example, from a metal material such as stainless steel, each of which are formed in a cylindrical shape by press working.

Specifically, the first and second cushion rings 62, 64 are formed with a substantially constant thickness from a thin plate material. Fittings 66, which are fitted into the fitting grooves 54*a*, 54*b* of the piston 18, are formed on ends of each of the first and second cushion rings 62, 64, whereas on the other ends thereof, cylindrical portions 68 are formed, which are expanded in diameter in a radially outward direction with respect to the fittings 66. Connecting portions 70, which connect the fitting 66 and the cylindrical portion 68, are formed between the fitting 66 and the cylindrical portion 68, substantially perpendicular to an axis of each of the first and second cushion rings 62, 64.

The fitting 66 projects at a given height along the axial direction with respect to the connecting portion 70, wherein the interior of the fitting 66 defines a hole 72 through which the piston rod 51 is inserted. Specifically, the fitting 66 communicates with the interior of the cylindrical portion 68 through the hole 72.

A tapered shape, which is gradually reduced in diameter in a direction separating away from the fitting 66, is formed on an end of the cylindrical portion 68. More specifically, when the first and second cushion rings 62, 64 are inserted respectively into the recess 24 and the expanded diameter portion 40, since the cushion rings 62, 64 approach and enter into the recess 24 and the expanded diameter portion 40 from the tapered ends of the cylindrical portions 68, movement thereof can be smoothly accomplished, and along therewith, the displacement speed of the piston 18 is smoothly decelerated.

The first cushion ring 62 is connected to the piston 18 by fitted engagement of the fitting 66 into the fitting groove 54*a* formed on the one end surface 18*a* of the piston 18, whereupon the connecting section 56 of the piston rod 51 is inserted through the hole 72. In addition, after the piston rod 51 has been inserted into the washer 58, the connecting portion 70 of the first cushion ring 62 is gripped between the washer 58 and the piston 18 by threaded engagement of the connecting nut 60. As a result, the first cushion ring 62 is connected to the one end surface 18*a* of the piston 18, in a state whereby the washer 58 and the connecting nut 60 are accommodated within a space 68*a* formed inside the cylindrical portion 68. Accordingly, the washer 58 and the connecting nut 60 are accommodated within the first cushion ring 62, thereby restraining the amount by which the washer 58 and the connecting nut 60 project from the one end surface 18*a* of the piston 18.

On the other hand, the second cushion ring 64 is connected to the piston 18 by fitted engagement of the fitting 66 into the fitting groove 54*b* formed on the other end surface 18*b* of the piston 18. By abutment of a stepped portion 74 of the piston rod 51, which is inserted through the hole 72, against the connecting portion 70, the second cushion ring 64 is sandwiched and gripped between the stepped portion 74 and the piston 18. In addition, by threaded engagement of the connecting nut 60 onto the piston rod 51, the second cushion ring 64 is connected to the other end surface 18*b* of the piston 18, in a state such that the piston rod 51 is inserted through the cylindrical portion 68.

Stated otherwise, the first cushion ring 62 is arranged such that the cylindrical portion 68 thereof opens toward the side of the recess 24 (in the direction of the arrow A), whereas the second cushion ring 64 is arranged such that the cylindrical portion 68 thereof opens toward the side of the rod hole 34 (in the direction of the arrow B).

Further, the outer diameter of the cylindrical portion 68 is set to be slightly smaller than the inner diameter of the recess 24 as well as the inner diameter of the expanded diameter portion 40 of the rod hole 34, so that when the cylindrical portion 68 is inserted into the recess 24 and the rod hole 34, the first and second sealing rings 26, 42 come into sliding contact with the outer circumferential surface of the cylindrical portion 68.

The above-described first and second cushion rings 62, 64 are not limited to being disposed respectively on both end surfaces 18*a*, 18*b* of the piston 18. It is also acceptable if a cushion ring is disposed on only one of the end surfaces.

The fluid pressure cylinder 10 according to the present invention is basically constructed as described above. Next, operations and effects of the fluid pressure cylinder 10 shall be explained. Explanations shall be made assuming that the piston 18 is displaced toward the head cover 14 (in the direction of the arrow A), as shown in FIG. 1, and wherein a state in which the first cushion ring 62 is accommodated within the recess 24 is taken as an initial position.

First, pressure fluid from an unillustrated pressure fluid supply source is introduced into the first fluid port 28. In this case, the second fluid port 44 is placed in a state of being open to atmosphere by a switching operation of an unillustrated directional control valve.

As a result thereof, the pressure fluid is supplied from the first fluid port 28, through the communication passage 30*a*, and into the recess 24. The piston 18 then is pressed toward the rod cover 16 (in the direction of the arrow B) by the pressure fluid that is introduced into the cylinder chamber 20 from the recess 24. In addition, the piston rod 51 is displaced due to displacement of the piston 18, wherein the first cushion ring 62, which is installed on the end of the piston rod 51, detaches and moves away from the recess 24 while sliding in contact with the first sealing ring 26.

Next, upon displacement of the piston 18, the second cushion ring 64 is inserted into the expanded diameter portion 40 of the rod hole 34, whereby the flow amount of the pressure fluid is constricted and compressed within the cylinder chamber 20. As a result, a displacement resistance when the piston 18 is displaced occurs, and the displacement speed of the piston 18 gradually is lessened as the piston 18 approaches its displacement terminal end position. That is, a cushioning effect is performed, which is capable of decelerating the displacement speed of the piston 18.

Figure 6:
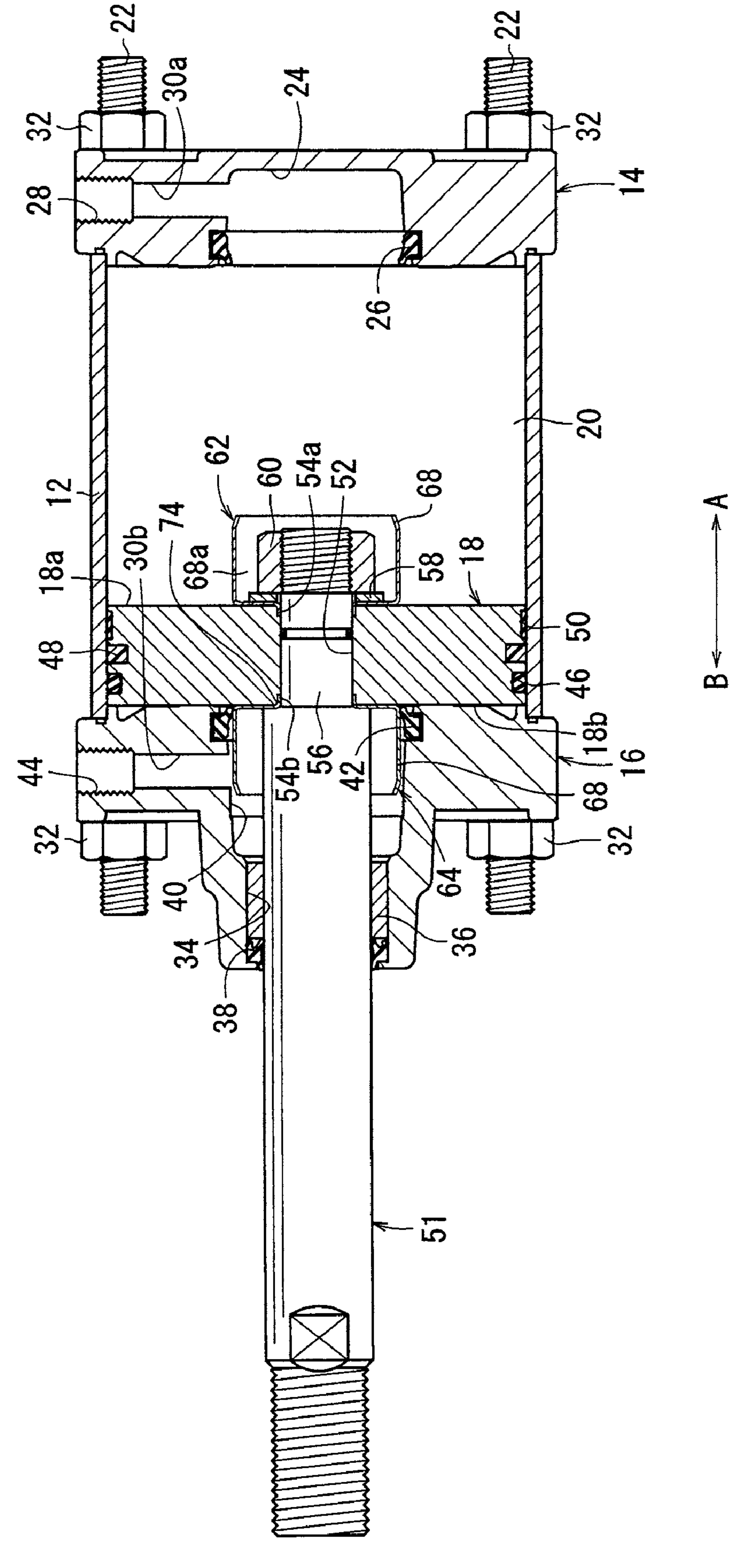
FIG. 6 is an overall vertical cross sectional view showing a state in which the piston is displaced to the side of a rod cover, in the fluid pressure device of FIG. 1.

Lastly, the piston 18 continues being displaced gradually toward the side of the rod cover 16, whereupon by accommodation of the second cushion ring 64 totally within the rod hole 34, the piston 18 reaches its displacement terminal end position alongside the rod cover 16 (in the direction of the arrow B; see FIG. 6).

On the other hand, in the case that the piston 18 is displaced in the opposite direction (in the direction of the arrow A), the pressure fluid is supplied to the second fluid port 44, and the first fluid port 28 is placed in a state of being open to atmosphere by a switching operation of the directional control valve (not illustrated). In addition, the pressure fluid is supplied from the second fluid port 44, through the communication passage 30*b*, and into the rod hole 34, and the piston 18 then is pressed toward the head cover 14 (in the direction of the arrow A) by the pressure fluid that is introduced into the cylinder chamber 20 from the rod hole 34.

In addition, the piston rod 51 is displaced due to displacement of the piston 18, wherein the second cushion ring 64, which is installed on the end of the piston rod 51, detaches and moves away from the expanded diameter portion 40 while sliding in contact with the second sealing ring 42.

Next, the first cushion ring 62 is inserted into the recess 24 by displacement of the piston 18, whereby the flow amount of pressure fluid that flows from the cylinder chamber 20 and through the recess 24 is constricted and compressed within the cylinder chamber 20. As a result, a displacement resistance when the piston 18 is displaced occurs, and the displacement speed of the piston 18 gradually is lessened. The piston 18 then is restored to its initial position (see FIG. 1), at which the piston 18 is displaced against the side of the head cover 14 (in the direction of the arrow A).

As discussed above, in the present embodiment, first and second cushion rings 62, 64 are disposed on both end surfaces 18*a*, 18*b* of the piston 18, wherein the first and second cushion rings 62, 64 are formed with hollow cylindrical shapes by press working, from a thin plate metal material. Therefore, compared with the conventional fluid pressure cylinder having a cushion mechanism constructed from a small piston formed with a solid shaft shape, a further reduction in weight of the fluid pressure cylinder 10 can be promoted.

Further, by forming the head cover 14 and the rod cover 16 from an aluminum alloy, along with the first and second cushion rings 62, 64, a further reduction in weight of the fluid pressure cylinder 10 is enabled.

Further, because it is unnecessary to carry out additional processing on the first and second cushion rings 62, 64, owing to the fact that the first and second cushion rings 62, 64 are formed simply by press working from a thin plate metal material, manufacturing costs can be reduced. Stated otherwise, the hollow cylindrical shaped first and second cushion rings 62, 64 can be manufactured at a low cost, and the fittings 66 and cylindrical portions 68 of the first and second cushion rings 62, 64 can be formed very easily.

Still further, by providing fittings 66 on ends of the first and second cushion rings 62, 64, which project toward sides of the piston 18 and which are fitted into fitting grooves 54*a*, 54*b* of the piston 18, the first and second cushion rings 62, 64 can be easily connected to the piston 18 via the fittings 66, whereby the first and second cushion rings 62, 64 can be displaced integrally in unison with the piston 18.

The fluid pressure cylinder 10 according to the present invention is not limited to the above-described embodiment, but various other structures and configurations thereof may be adopted without deviating from the essential features and gist of the present invention.

What is claimed is:

1. A fluid pressure cylinder including a cylinder body having a cylinder chamber therein closed by a pair of cover members, a piston disposed inside said cylinder body and which is displaceable along an axial direction in said cylinder chamber, and ports through which a pressure fluid is supplied and discharged disposed respectively in said cover members, said fluid pressure cylinder comprising:

a piston hole defined in said piston that penetrates in an axial direction through said piston, said piston hole having an annular fitting groove disposed on an end surface side of said piston, said fitting groove being expanded in diameter with respect to said piston hole, said fitting groove being defined between an outer circumferential surface of a piston rod that is inserted through said piston hole and an inner circumferential surface of said piston hole;

a hollow cylindrical ring body installed on an end of said piston along the axial direction thereof, and which is displaceable together with said piston; and an accommodating hole formed in at least one of said cover members, for receiving and accommodating said ring body therein upon displacement of said piston, wherein said ring body is formed by press working from a metal material, and wherein one end of said ring body comprises a fitting projecting in an axial direction toward a side of said piston for fitting said ring body into said piston, said fitting being fitted into said fitting groove.

2. The fluid pressure cylinder according to claim 1, wherein said ring body is installed on at least one of one end and another end along the axial direction of said piston.

3. The fluid pressure cylinder according to claim 1, wherein another end of said ring body is open toward a side of said cover member, and is formed in a tapered shape that gradually reduces in diameter in a radial direction toward an end thereof on the side of said cover member.

4. The fluid pressure cylinder according to claim 3, wherein an interior of said ring body includes a space capable of accommodating therein a nut that connects said piston to said piston rod.

5. The fluid pressure cylinder according to claim 4, wherein said fitting groove is defined on an end surface of said piston that faces toward said cover member.

6. The fluid pressure cylinder according to claim 5, wherein said piston rod is inserted through an interior portion of said ring body.

7. The fluid pressure cylinder according to claim 6, wherein said ring body slidably contacts a seal member disposed on an inner circumferential surface of said accommodating hole upon displacement of said piston.

* * * * *